(12) United States Patent
Kato

(10) Patent No.: US 8,013,597 B2
(45) Date of Patent: Sep. 6, 2011

(54) SLIDE OPERATION DEVICE

(75) Inventor: Kojiro Kato, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 359 days.

(21) Appl. No.: 12/021,679

(22) Filed: Jan. 29, 2008

(65) Prior Publication Data

US 2008/0180094 A1  Jul. 31, 2008

(30) Foreign Application Priority Data

Jan. 29, 2007 (JP) ................................. 2007-017930

(51) Int. Cl.
*G01B 7/14* (2006.01)
(52) U.S. Cl. .................................. 324/207.24
(58) Field of Classification Search ............. 324/207.22, 324/207.24, 207.2, 207.21; 33/706, 707
See application file for complete search history.

(56) References Cited

U.S. PATENT DOCUMENTS

| 5,336,586 | A | 8/1994 | Togawa et al. | |
| 2006/0052671 | A1* | 3/2006 | McCarthy | 600/232 |
| 2007/0002488 | A1* | 1/2007 | Kato | 360/85 |

FOREIGN PATENT DOCUMENTS

| JP | 62226007 | * 10/1987 | ........ 400/279 |
| JP | 2005-233923 | * 9/2005 | |
| JP | 2006-49302 | 2/2006 | |

OTHER PUBLICATIONS

Notification of the First Office Action mailed Nov. 20, 2009, for CN Application No. 2008100052119, with English Translation, 13 pages.

* cited by examiner

*Primary Examiner* — Kenneth J Whittington
(74) *Attorney, Agent, or Firm* — Morrison & Foerster LLP

(57) ABSTRACT

A slide operation device is comprised of a movement guide of a rod-shape, and a moving block that slides on the movement guide for setting an electric parameter as a measurement value in accordance with a movement amount or position of the moving block in a slide direction along the movement guide. The movement guide is composed of a slide bar and a magnetic scale material. The slide bar is formed of a rigid member with strength difficult to be bent, and formed with a groove extending along the slide direction. The magnetic scale material is made from a resin and a magnetic material and filled in the groove. The slide bar is formed with a concave which is deeper than the groove and which extends in a direction perpendicular to the slide direction, and the magnetic scale material is also filled in the concave.

8 Claims, 5 Drawing Sheets

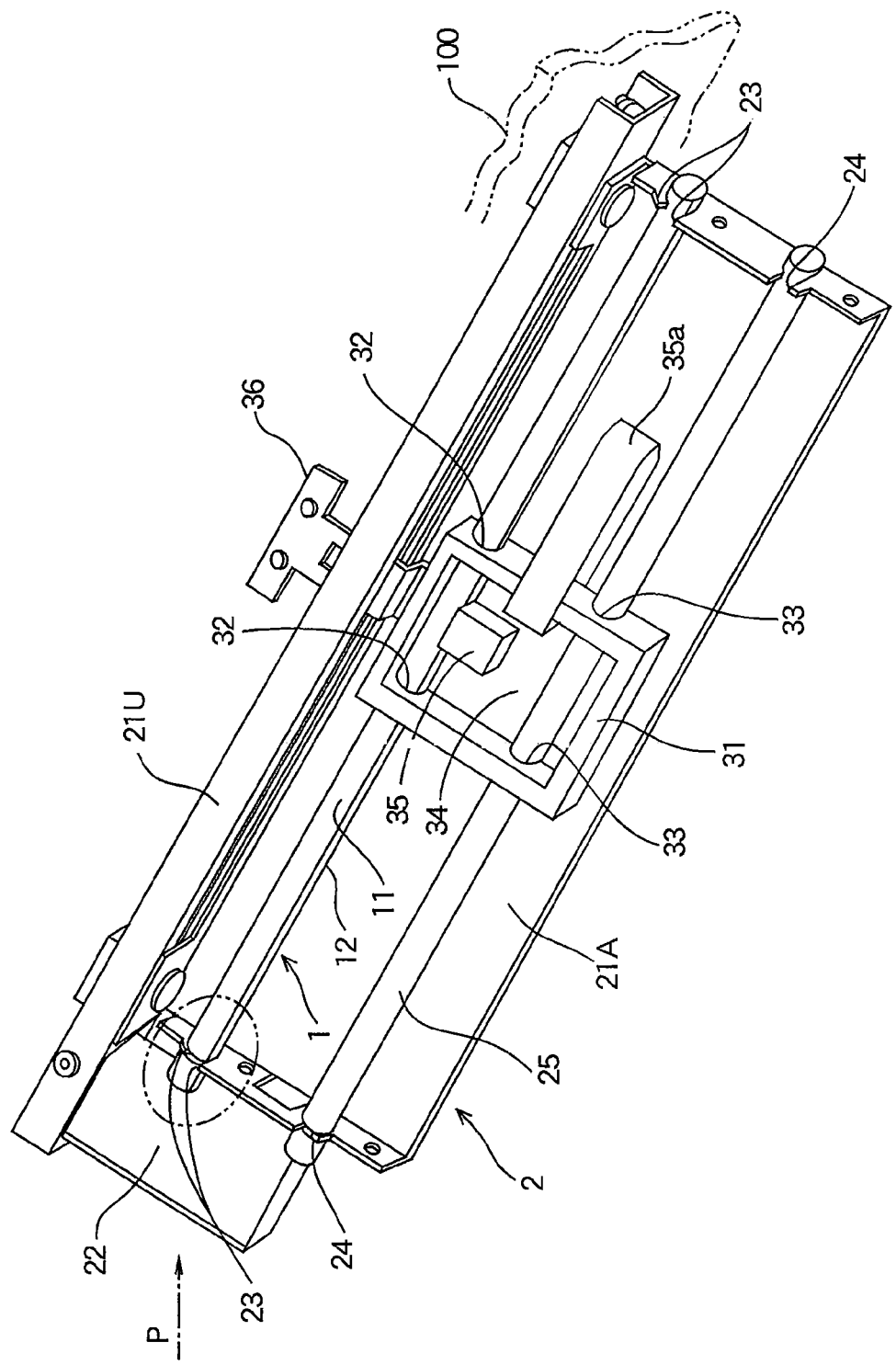

ized. The moving block is held slidably by a main movement guide body and an auxiliary movement guide body in parallel with each other. The auxiliary movement guide body comprises a non-magnetic stainless shaft formed by insertion-molding of a magnetic material. And by detecting a magnetic polar pattern formed on the magnetic material by a magnetic sensor provided in the moving block, a position of the slide operator is detected, and the electric parameter is set in accordance with its movement amount as a measurement value.

SLIDE OPERATION DEVICE

BACKGROUND OF THE INVENTION

1. Technical Field

The present invention relates to a slide operation device in which a moving block slides on a slide bar manually or electrically in a linear magnetic encoder, and an electrical parameter is set in accordance with a movement amount or absolute position of the moving block as a measurement value.

2. Background Art

This type of slide operation devices include the one disclosed in Japanese Patent Laid-Open No. 2006-49302. The slide operation device disclosed in Japanese Patent Laid-Open No. 2006-49302 is used as a fader of a mixing console, for example, and is configured such that a moving block moves along a guide body by manual operation of a slide operator. The moving block is held slidably by a main movement guide body and an auxiliary movement guide body in parallel with each other. The auxiliary movement guide body comprises a non-magnetic stainless shaft formed by insertion-molding of a magnetic material. And by detecting a magnetic polar pattern formed on the magnetic material by a magnetic sensor provided in the moving block, a position of the slide operator is detected, and the electric parameter is set in accordance with its movement amount as a measurement value.

If the movement guide body holding the moving block is made as a magnetic scale body, the entire movement guide body could be formed from a permanent magnetic material, but actually magnetic alloys are expensive and ferrites are fragile and have a problem in durability. On the other hand, if the movement guide body is mainly constructed by a substantially rod-shape shaft (slide bar) made of a non-magnetic stainless, it would be excellent in durability as a guide body.

However, in the above prior art, since the movement guide body is constituted by embedding a magnetic member (magnetic scale material) in a groove formed along the longitudinal direction of the non-magnetic stainless shaft (slide bar), there is a possibility that a part of the magnetic member is separated from the shaft by use for a long time. Particularly, the magnetic member tends to separate from the end portion of the shaft. Also, if the shaft is firmly fixed at the both ends to a case, there is a problem that the magnetic member is displaced in the longitudinal direction and becomes susceptible to separation due to a difference in linear expansion coefficient between the shaft and the magnetic member. Moreover, if the shaft is firmly fixed to the case at the both ends, there is a problem that the shaft is deformed in a direction crossing the axis due to thermal stress and an appropriate gap between a magnetic sensor and the magnetic member cannot be ensured, which causes lowered accuracy.

SUMMARY OF THE INVENTION

The present invention has an object to provide a slide operation device with high durability and accuracy and a simple constitution which prevents separation of the magnetic scale material from the slide bar.

In a first aspect of the invention, a slide operation device comprises; a movement guide of a rod-shape; and a moving block that slides on the movement guide for setting an electric parameter as a measurement value in accordance with a movement amount or position of the moving block in a slide direction along the movement guide, wherein the movement guide comprises: a slide bar that is formed of a rigid member with a strength difficult to be bent, and that is formed with a groove extending along the slide direction; and a magnetic scale material that is made from a resin and a magnetic material and that is filled in the groove, and wherein the slide bar is formed with a concave which is deeper than the groove and which extends in a direction perpendicular to the slide direction, and the magnetic scale material is also filled in the concave.

Preferably, the inventive slide operation device further comprises a case body for holding the slide bar, wherein the slide bar is formed with another groove that extends in a circumferential direction of the slide bar along a peripheral face of an end portion of the slide bar for engagement with the case body.

In a second aspect of the invention, a slide operation device comprises: a movement guide of a rod-shape; and a moving block that slides on the movement guide for setting an electric parameter as a measurement value in accordance with a movement amount or position of the moving block in a slide direction along the movement guide, wherein the movement guide comprises: a slide bar that is formed of a rigid member with a strength difficult to be bent, and that is formed with a groove extending along the slide direction; and a magnetic scale material that is made from a resin and a magnetic material and that is filled in the groove, and wherein the movement guide comprised of the slide bar and the magnetic scale material has the rod-shape defined by an outer peripheral surface that is divided into a flat section extending in the slide direction and a round section extending circumferentially from the flat section.

In a third aspect of the invention, a slide operation device comprises: a movement guide of a rod-shape; a case body having a holding portion for holding the movement guide; and a moving block that slides on the movement guide for setting an electric parameter as a measurement value in accordance with a movement amount or position of the moving block in a slide direction along the movement guide, wherein the movement guide comprises: a slide bar that is formed of a rigid member with a strength difficult to be bent, and that is formed with a groove extending along the slide direction; and a magnetic scale material that is made from a resin and a magnetic material and that is filled in the groove, wherein the movement guide comprised of the slide bar and the magnetic scale material has the rod-shape defined by an outer peripheral surface that is divided into a flat section extending in the slide direction and a round section extending circumferentially from the flat section, and wherein the flat section is configured so as to be held in contact with a contact end face of the holding portion projected from the case body.

Preferably in the first aspect of the invention, the concave may be formed at an end portion only one side of the slide bar. By this arrangement, even if an expansion/contraction amount in the longitudinal direction is different between the slide bar and the magnetic scale material due to a difference in the linear expansion coefficient between the slide bar and the magnetic scale material, stress due to the difference in the expansion/contraction amount can be released in the longitudinal direction of the slide bar, and separation in the direction (short-side direction) perpendicular to the slide direction of the slide bar in the magnetic scale material can be prevented.

Also, in the first aspect of the invention, said another groove may be formed at an end portion only one side of the slide bar. By this arrangement, thermal stress of the slide bar (though it is slight) can be released in the longitudinal direction of the slide bar, and deformation (displacement) in the direction (short-side direction) perpendicular to the slide direction of the slide bar can be prevented, and an appropriate gap between the magnetic sensor and the magnetic scale material can be ensured.

According to the first aspect of the inventive slide operation device, since the magnetic scale material is inserted into a position deeper than the groove at the concave of the slide bar, displacement of the magnetic scale material in the longitudinal direction with respect to the slide bar can be prevented with a simple construction.

Preferably according to the first aspect of the inventive slide operation device, said another groove provides a holding means to the case body, by cramping said another groove by a steel plate of the case body or the like, rattling (or displacement) of the entire movement guide made by the slide bar and the magnetic scale material in the longitudinal direction can be prevented with a simple construction.

According to the second aspect of the inventive slide operation device, an angle of the opposing face of the magnetic scale material (namely, the flat section of the movement guide) to the magnetic sensor mounted in the moving block can be regulated inexpensively and easily with a simple construction.

According to the third aspect of the inventive slide operation device, the movement guide can be held at the case body with a simple construction of the flat section and the contact end face of the slide bar holding portion, and the angle of the opposing face of the magnetic scale material (the flat section of the movement guide) to the magnetic sensor can be regulated inexpensively and easily.

BRIEF DESCRIPTION OF THE DRAWINGS

FIG. 5 is a perspective view of an essential part of a slide operation device of the embodiments.

DETAILED DESCRIPTION OF THE INVENTION

Figure 1A:
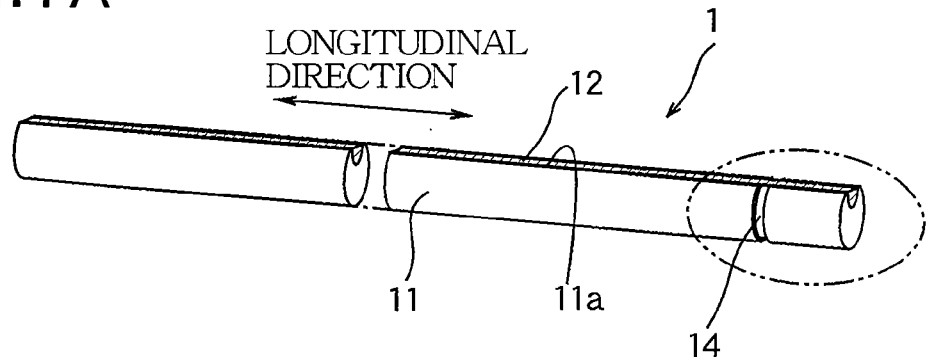
FIGS. 1A, 1B, 1C and 1D are a partially omitted perspective view and an enlarged sectional view of a movement guide of a first embodiment of the present invention, and magnetic code patterns of the first embodiment.

Embodiments of the present invention will be described below referring to the attached drawings. A shaded line indicating a section in a figure may be omitted as appropriate. FIG. 5 is a perspective view of an essential part of a slide operation device in the embodiment. This slide operation device is mounted on a mixer machine, and a case body 2 comprises a side plate 21A forming a perpendicular face with respect to a console panel face 100 of the mixer device on its back side, a side plate (not shown) forming a pair with the side plate 21A on the front side, and an upper frame 21U with a section in the U shape. At one end of the upper frame 21U, a motor 22 is mounted. At both ends of the side plate 21A, holding claws 23, 23 as a "movement guide holding portion" are projected by bending work. And as will be described later, a movement guide 1 is mounted between the holding claws 23, 23. Also, an auxiliary guide 25 is mounted between holding claws 24, 24.

The movement guide 1 comprises a slide bar 11 and a magnetic scale material 12, and at the movement guide 1 and the auxiliary guide 25, a moving block 31 is mounted slidably in the longitudinal direction (slide direction) of the movement guide 1 and the auxiliary guide 25. A lever 36 is mounted to the moving block 31 for attaching an operator piece, not shown. A motor 22 reciprocates the moving block 31 for automatically setting a position of the slide operator of the slide operation device. The moving block 31 is resin-molded, and guide holes 32, 32 into which the movement guide 1 is fitted and inserted are formed on the upper side of a frame body in the square shape, and auxiliary guide holes 33, 33 into which the auxiliary guide 25 is fitted and inserted are formed on the lower side. Also, a board 34 is mounted inside the frame body, and a magnetic sensor 35 is mounted to this board 34.

Figure 1B:
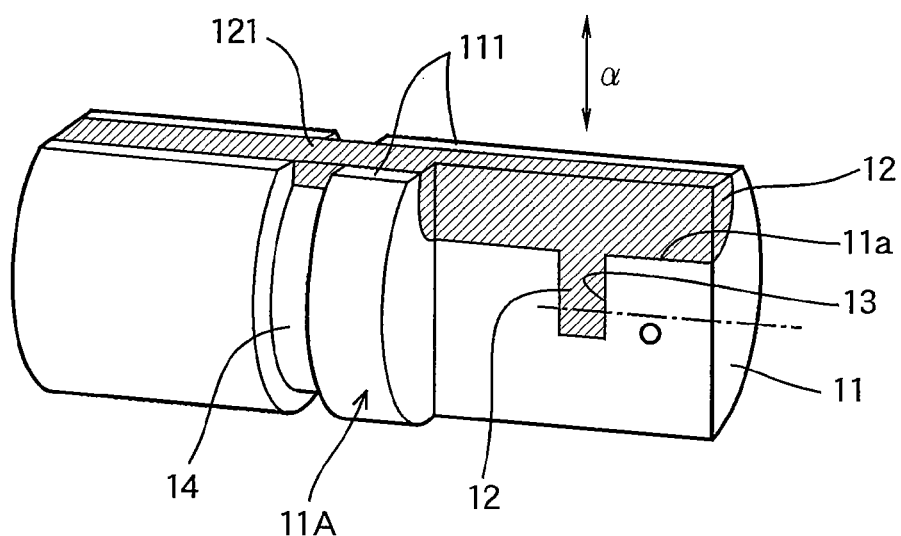
Figure 1C:
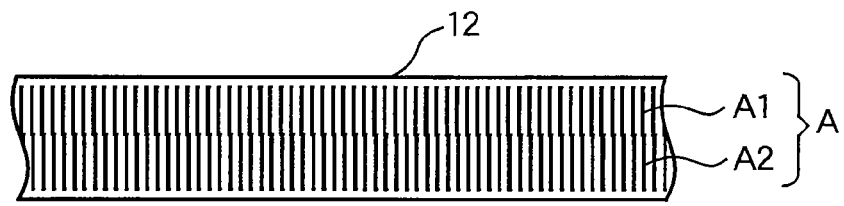

FIG. 1C shows an example of a magnetic pattern A formed along the longitudinal direction of the magnetic scale material 12. The magnetic scale material 12 is formed with N poles and S poles which are polarized alternately with a period (pitch) of 330 µm, for example, so as to form magnetic scale. As shown in FIG. 1C, the scale material 12 is magnetized by a magnetizer (not shown) under a state where the magnetic scale material 12 is cast into the groove of the slide bar. Magnetic pattern A is formed like stripes on the magnetic scale material 12 by the magnetizer. The stripe pattern is not visible, but magnetically sensible by a magnetic sensor mounted in the moving block. In order to detect not only a position of the moving block but also detect the moving direction of the block, the magnetic pattern A is divided into a pair of sub-patterns A1 and A2 which are parallel to each other. The stripe patterns A1 and A2 have the same pitch and shifted from each other by ¼ of the pitch.

Returning to FIG. 5, the magnetic sensor 35 is arranged in opposed relation to the magnetic scale material 12 so as to constitute a movement amount detection part for detecting the movement amount of the moving block 31. The magnetic sensor 35 is provided with two magneto resistance effect detecting elements (MR elements), and when the moving block 31 is moved along the movement guide 1 and the auxiliary guide 25, the magnetic sensor 35 detects the magnetic pole of the magnetic scale material 12 and outputs a signal. A detection signal of the magnetic sensor 35 is sent to a circuit, not shown, through a flat cable 35a, and an electric parameter is set in accordance with the movement amount of the moving block 31 as a measurement value based on the detection signal.

FIG. 1A is a perspective view of a first embodiment of the movement guide 1 with a part thereof omitted, and FIG. 1B is an enlarged sectional view of a part bordered by a two-dot chain line in FIG. 1A. The portion of the magnetic scale material 12 is given a shaded line. The slide bar 11 is formed by drawing non-magnetic stainless (18Cr-8Ni austenite), which is a non-magnetic metal, and made of a rigid member having a strength difficult to be bent. The diameter Φ of the movement guide 1 is approximately 4 mm. On the slide bar 11, a groove 11a is formed over the entire length of the slide bar 11 in the slide direction (longitudinal direction). The magnetic scale material 12 is plastic magnet formed by mixing and kneading a ferrite powder, which is a magnetic material powder as a "magnetic material", and plastic, which is a thermoplastic resin as a "resin". And this plastic magnet is insertion-molded or cast into the groove 11a in the slide bar 11 so that the magnetic scale material 12 and the slide bar 11 are integrally formed.

FIG. 1B shows a portion held by the holding claws 23, 23, which are end portions of the movement guide 1, and at the one end portion, a concave 13 is formed by drilling or cutting a round hole (vertical hole) deeper than the groove 11a in a direction perpendicular to the slide direction of the slide bar 11 for example, in the radial direction of the slide bar 11 (arrow α direction in the figure) and toward the shaft center O. In the concave 13, the magnetic scale material 12 is filled continuously from inside the groove 11a.

As mentioned above, the magnetic scale material 12 is integrally formed within the groove 11a and within the concave 13, and the magnetic scale material 12 is brought into close contact both with the groove 11a and the concave 13 and in the structure extremely difficult to be separated from the groove 11a of the slide bar 11. Also, due to a difference in linear expansion coefficient between the slide bar 11 and the magnetic scale material 12, even if the magnetic scale material 12 is relatively expanded/contracted in the longitudinal direction with respect to the slide bar 11, since the concave 13 is formed only on one side of the slide bar 11, stress due to the expansion/contraction amount can escape in the longitudinal direction, and separation of the magnetic scale material 12 in the direction (short-side direction) perpendicular to the slide direction of the slide bar 11 can be prevented.

Also, a little inside of the slide bar 11 from the concave 13 (end portion of the slide bar), another groove (second groove) 14 is cut so as to sink in the radial direction on a peripheral face 11A of the slide bar 11. The annular second groove 14 constitutes a holding portion to the case body 2 as will be described later. On the peripheral face 11A of the movement guide 1, portions on both sides of the magnetic scale material 12 of the slide bar 11 are made as planer flat faces 111, and an outer face of the magnetic scale material 12 between these flat faces 111 is made as a planer flat face 121. The flat faces 111, 121 constitute a flat section of the movement guide 1 in the same level. By this arrangement, the movement guide 1 is in the shape of an irregular round-rod having a flat section. The movement guide 1 comprised of the slide bar 11 and the magnetic scale material 12 has the rod-shape defined by an outer peripheral surface that is divided into a flat section 111 and 121 extending in the slide direction and a round section extending circumferentially from the flat section 111 and 121.

As will be described later, on the portion of the second groove 14 and the portions of the flat faces 111, 121, the slide bar 11 (movement guide 1) is held to the case body 2 by the holding claws 23, 23. This holding structure will be described later using the movement guide of a second embodiment as an example.

In the above embodiment, the concave 13 is formed in the radial direction (the arrow α direction in the figure) of the slide bar 11 and the direction toward the shaft center O, but it is only necessary that such a concave is in a direction perpendicular to the slide direction of the slide bar 11, and a concave bifurcated from the groove 11a may be formed in the direction perpendicular to the slide direction.

Figure 1D:
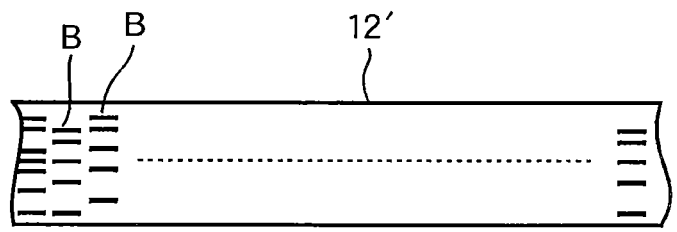
Figure 2A:
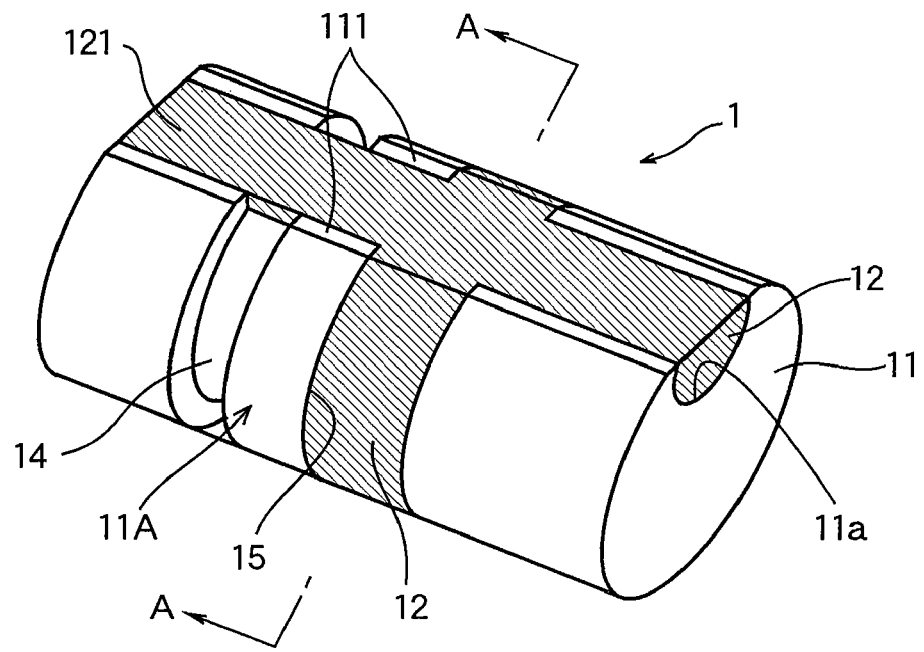
FIGS. 2A and 2B are a partially enlarged perspective view and a partially enlarged sectional perspective view of a movement guide of a second embodiment of the present invention.
Figure 2B:
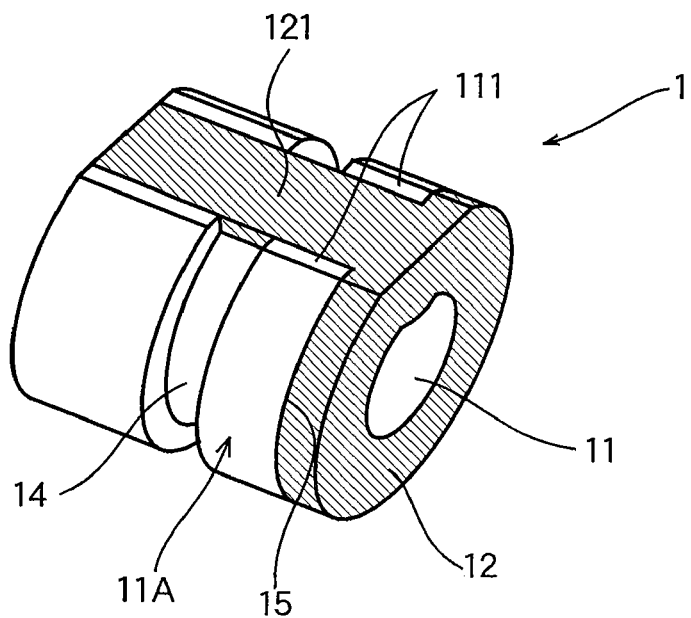

FIG. 2 shows a partially enlarged perspective view of the second embodiment of the movement guide 1 (FIG. 2A) and a partially enlarged sectional perspective view (FIG. 2B), and FIG. 2B shows an A-A section of FIG. 2A. The same construction as in the first embodiment is given the same reference numerals as in FIG. 1 and the detailed description will be omitted. Also, the materials of the slide bar 11 and the magnetic scale 12 are the same as those in the first embodiment. In this second embodiment, an annular re1cess 15 is formed on the entire circumference of the peripheral face 11A of the slide bar 11 in parallel to the second groove 14, and the magnetic scale material 12 is filled in the recess portion 15 continuously from inside the groove 11a. In this second embodiment, too, the magnetic scale material 12 is brought into close contact with both the groove 11a and the recess portion 15. Moreover, since the magnetic scale material 12 in the recess portion 15 in the second embodiment is in the structure surrounding the entire circumference of the slide bar 11, the magnetic scale material 12 is placed in the structure extremely difficult to be separated from the groove 11a. Also, since the recess portion 15 is formed only on one side of the slide bar 11, separation due to the difference in the linear expansion coefficient can be also prevented as in the first embodiment.

By forming both the concave 13 in the first embodiment and the recess portion 15 in the second embodiment and filling the magnetic scale material 12 therein, the above advantage is further enhanced.

Figure 3:
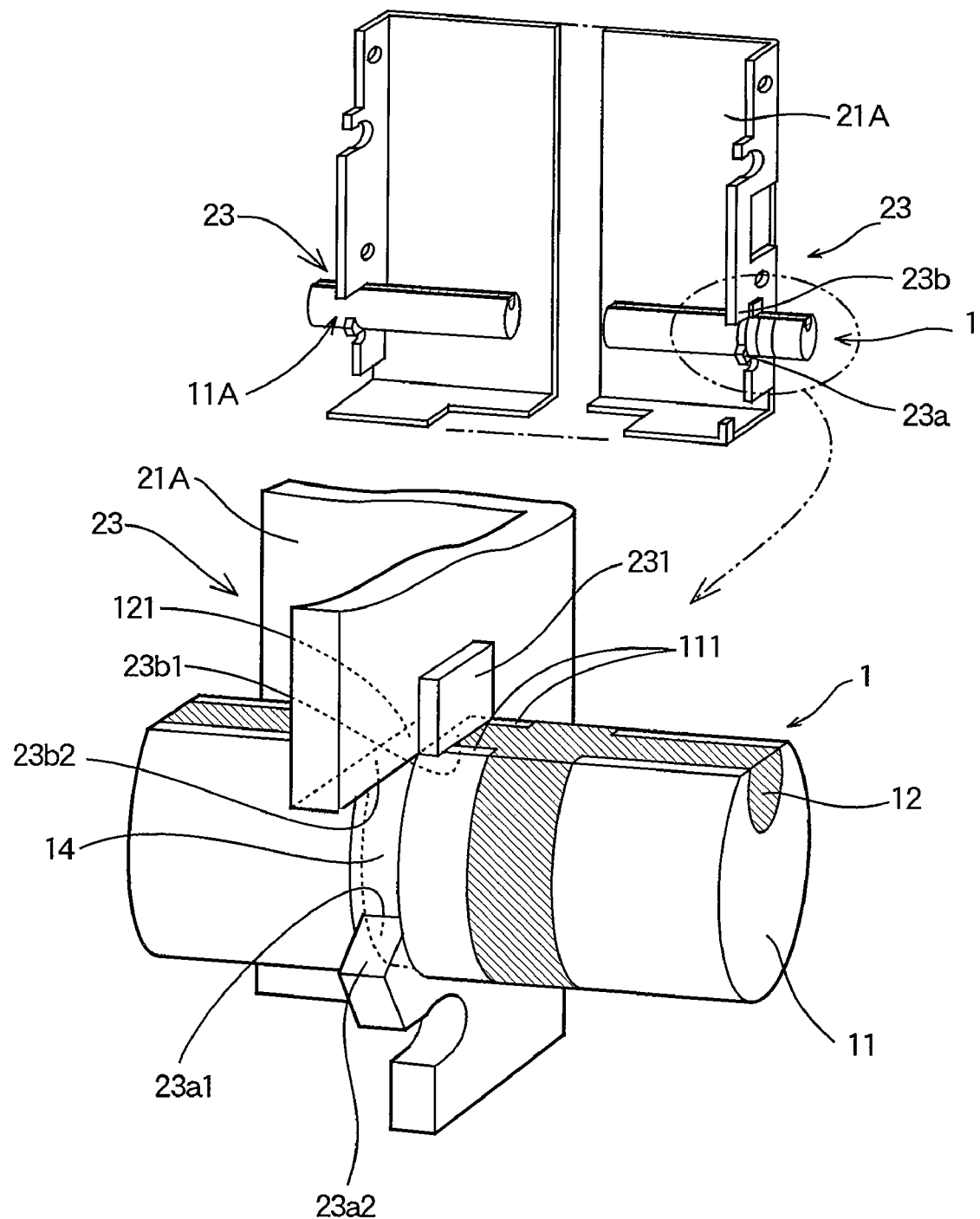
FIG. 3 is a view illustrating the details of a holding structure of the movement guide in the embodiments.

FIG. 3 is a view showing the detail of the holding structure of the movement guide 1 to the case body 2, and FIG. 3 is a view showing a portion of the holding claw 23 surrounded by a two-dot chain line oval shown in FIG. 5 seen from the direction of an arrow P. FIG. 3 turns FIG. 1 upside down and illustrates the movement guide 1 in the second embodiment. The auxiliary guide 25 is not shown. The holding claw 23 has an engagement piece 23a located on the side opposite the magnetic scale material 12 of the movement guide 1 and a contact piece 23b opposite the engagement piece 23a with the movement guide 1 between them.

The engagement piece 23a has an arc-shape engagement face 23a1 conforming to the bottom face of the second groove 14 in the slide bar 11 and a tapered face 23a2 extended on the side opposite the side plate 21A from the end of the engagement face 23a1. Also, the contact piece 23b has a projection 231 at a position offset from the second groove 14 of the slide bar 11, and a face of the projection 231 on the movement guide 1 side is a first contact end face 23b1 to be brought into contact with the flat face 111 of the slide bar 11. Moreover, the contact piece 23b has a second contact end face 23b2 brought into contact with the flat face 121 of the magnetic scale material 12 at a position corresponding to the second groove 14.

When the movement guide 1 is engaged with the holding claw 23, the second contact end face 23b2 of the contact piece 23b is brought into contact with the flat face 121 of the magnetic scale material 12 at the position of the second groove 14, while the tapered face 23a2 of the engagement piece 23a is inserted into the second groove 14 and the movement guide 1 is pushed between the engagement piece 23a and the contact piece 23b. By this operation, the engagement face 23a1 of the engagement piece 23a is fitted in the second groove 14, and (a part of) the flat face 111 of the slide bar 11 is pressed into contact with the first contact end face 23b1 of the projection 231. Also, the flat face 121 of the magnetic scale material 12 is pressed into contact with the second contact end face 23b2. Moreover, since the engagement piece 23a is fitted in the second groove 14, the movement guide 1 is not moved in the longitudinal direction but fixed with respect the holding claw 23.

At the other end of the movement guide 1 (end portion on the side where the second groove 14 is not formed), the holding claw 23 has the arc-shape face corresponding to the engagement face 23a1 in the shape conforming to the peripheral face 11A of the slide bar 11 and has the same contact end face as the second contact end face 23b2 of the contact piece 23b. And the peripheral face 11A and the flat face 111 of the slide bar 11 are held by being sandwiched by the arc-shape face and the contact end face, respectively. Therefore, at the other end, the movement guide 1 is movable in the longitudinal direction with respect to the holding claw 23. By this arrangement, thermal contraction of the slide bar 11 is absorbed.

As mentioned above, since the movement guide 1 is made in the shape of an irregular round rod with the flat section (flat faces 111, 121) and the movement guide 1 is held by bringing the contact end face into contact with the flat section, an angle around the shaft in the movement guide 1 of the flat face 121 in the magnetic scale material 12 is regulated. By this arrangement, an angle of the flat face 121 of the magnetic scale material 12 opposing to the magnetic sensor 35 is maintained appropriate. Also, a gap between the magnetic sensor 35 and the flat face 121 of the magnetic scale material 12 is ensured properly.

The magnetic pattern shown in FIG. 1C is the alternate arrangement of magnetic bands and non-magnetic bands which are arranged along the slide direction of the moving block so as to detect a movement amount of the moving block. However, the magnetic pattern of the scale material 12 is not limited to this structure. For example as shown in FIG. 1D, the magnetic scale material 12' is arranged on its flat face with a plurality of magnetic patterns B along the slide direction of the moving block. Each magnetic pattern B is composed of a set of bits arranged in a width direction orthogonal to the longitudinal direction of the slide bar. By such a magnetic pattern, the magnetic sensor can detect the absolute position of the moving block relative to the case body 2, for example. The magnetic sensor is constructed to read the set of bits at once. In order to increase the accuracy of position detection or decrease a frequency of detection errors, the gray coed system is employed for the magnetic pattern B arranged along the scale material 12'.

Figure 4:
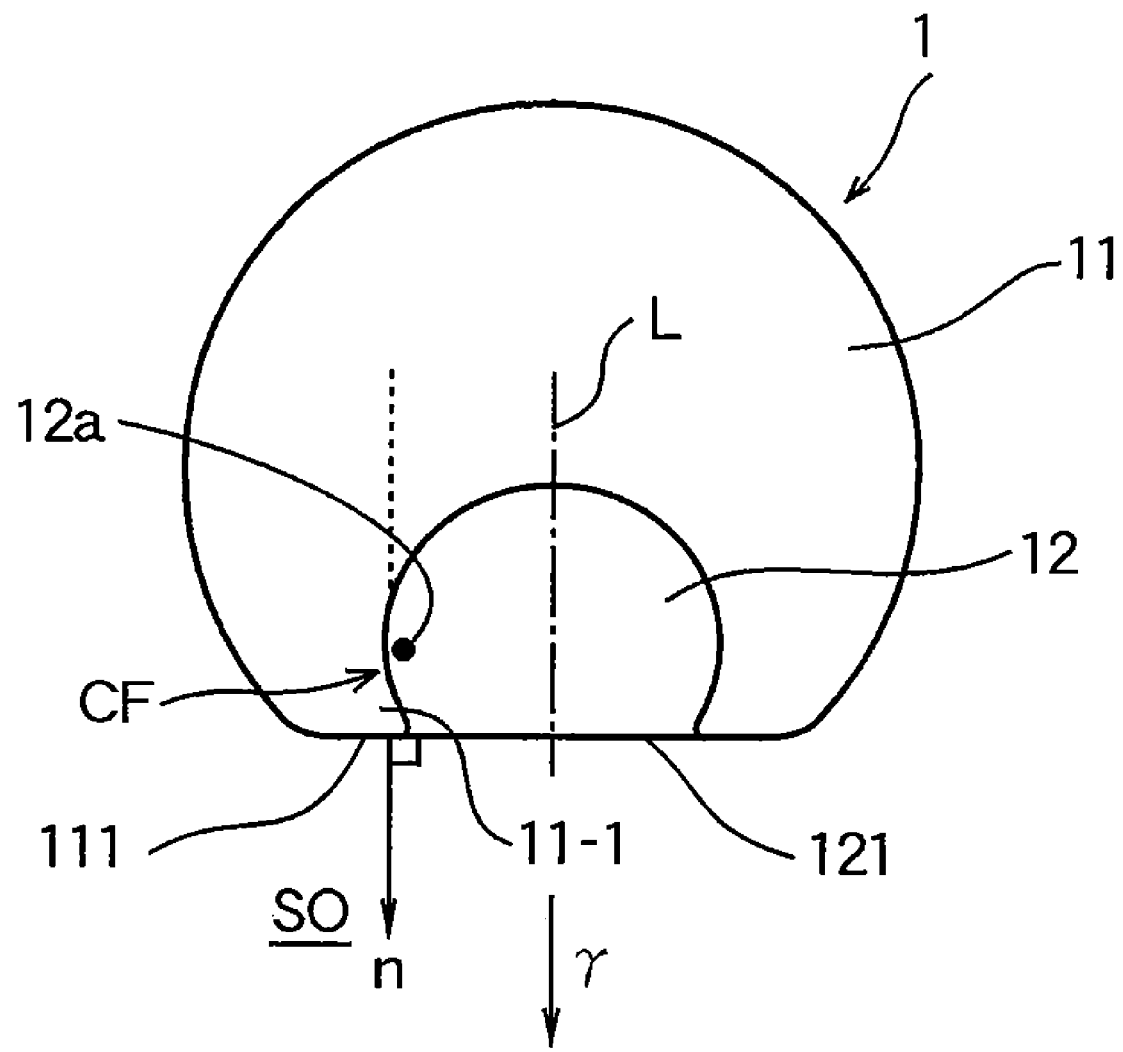
FIG. 4 is a view for explaining an undercut structure of the movement guide in the embodiments.

The slide bar 11 of the movement guide 1 may be the following undercut structure with respect to the magnetic scale material 12. As the end face (or cross-sectional face) of the movement guide 1 is shown with exaggerated dimension and angle in FIG. 4, a groove end portion 11-1 of the slide bar 11 is located between a side portion 12a of the magnetic scale material 12 and an outer space SO of the movement guide 1 on a normal n of the flat section (flat faces 111, 121). That is, a contact face CF with the slide bar 11 on both sides of the magnetic scale material 12 is in the undercut structure with respect to the flat face 111 of the slide bar 11 in inner and outer directions parallel with a center line L. This also applies to the opposite side. Therefore, the magnetic scale material 12 is in the structure extremely difficult to be separated against a force in the direction of an arrow γ.

In the above embodiments, the slide bar 11 is made from non-magnetic stainless but the material may be brass, duralumin, ceramic materials or the like, which is hard to rust and magnetized and rigid. Also, in the magnetic scale material 12, a ferrite powder is used as a magnetic material powder to be mixed with the plastic resin, but the magnetic material powder may be Fe—Cr—Co, Fe—Cu—Ni, Mn—Al'C, Nd—Fe or the like. As a compound, RE-Co (typically $Sm_2Co_{17}$) may be used. As an oxide, $y-Fe_2O_3$, Fe304 (magnetite) may be used. When hard-to-work magnet material powder is to be used, metal powder for binder is used.

The slide bar 11 is formed by a non-magnetic metal in the above embodiments, but the slide bar 11 may be formed by drawing a hard resin, and the magnetic scale material 12 may be formed by insertion-molding of the plastic magnet into the groove 11a in the slide bar 11 made of the hard resin. Alternatively, the magnetic scale material 12 is primarily molded from plastic magnet and the slide bar 11 made of hard resin is secondarily molded so that the movement guide 1 is formed by two-color molding of the resin.

The slide bar 11 may be formed by metal having a high magnetic permeability or formed by mixing a member having a high magnetic permeability in hard resin. In this case, since three faces on the outer circumference in the longitudinal direction of the magnetic scale material 12 is covered by the slide bar 11 having a high magnetic permeability, the movement guide 1 can obtain an effect of magnetic shield for shielding an outside magnetic field.

As another embodiment, though not shown, the movement guide 1 may be applied to a sliding shaft slidably holding a print-head of a printer machine. In this case, a head holding portion for holding the print head corresponds to the moving block, and the magnetic sensor is mounted, the magnetic sensor detecting a magnetic pole of the magnetic scale material 12 of the movement guide 1 (sliding shaft) so that a position of the head holding portion, that is, a position of the print head can be detected.

The invention claimed is:

1. A slide operation device comprising:
   a movement guide of a rod-shape; and
   a moving block that slides on the movement guide for setting an electric parameter as a measurement value in accordance with a movement amount or position of the moving block in a slide direction along the movement guide,
   wherein the movement guide comprises: a slide bar that is formed of a rigid member with a strength difficult to be bent, and that is formed with a generally circular groove forming an undercut on a flat surface of the movement guide extending along the slide direction; and a magnetic scale material that is made from a resin and a magnetic material and that is filled in the groove, and
   wherein the slide bar is formed with a concave which is deeper than the groove and which extends in a direction perpendicular to the slide direction and extends only a portion along the groove in the slide direction, and the magnetic scale material is also filled in the concave.

2. The slide operation device according to claim 1, further comprising a case body for holding the slide bar, wherein the slide bar is formed with another recess that extends in a circumferential direction of the slide bar along a peripheral surface of an end portion of the slide bar for engagement with the case body.

3. A slide operation device for a musical apparatus, the slide operation device comprising:
   a movement guide of a rod-shape;
   a moving block that slides on the movement guide for setting an electric parameter as a measurement value in accordance with a movement amount or position of the moving block in a slide direction along the movement guide; and
   a lever connected to the moving block for sliding the moving block in the slide direction for setting the electrical parameter for the musical apparatus,
   wherein the movement guide comprises: a slide bar that is formed of a rigid member with a strength difficult to be bent, and that is formed with a groove extending along the slide direction; and a magnetic scale material that is made from a resin and a magnetic material and that is filled in the groove,
   wherein the movement guide comprised of the slide bar and the magnetic scale material has the rod-shape defined by an outer peripheral surface that is divided into a flat section extending in the slide direction and a round section extending circumferentially from the flat section, and
   wherein a portion of the magnetic scale material extends beyond the groove in a circumferential direction around the movement guide.

4. A slide operation device comprising:
a movement guide of a rod-shape;
a case body having a holding portion for holding the movement guide,
a moving block that slides on the movement guide for setting an electric parameter as a measurement value in accordance with a movement amount or position of the moving block in a slide direction along the movement guide,
wherein the movement guide comprises: a slide bar that is formed of a rigid member with a strength difficult to be bent, and that is formed with a groove extending along the slide direction; and a magnetic scale material that is made from a resin and a magnetic material and that is filled in the groove,
wherein the movement guide comprised of the slide bar and the magnetic scale material has the rod-shape defined by an outer peripheral surface that is divided into a flat section extending in the slide direction and a round section extending circumferentially from the flat section,
wherein the flat section is configured so as to be held in contact with a contact end face of the holding portion projected from the case body, and
wherein a portion of the magnetic scale material extends beyond the groove in a circumferential direction around the movement guide.

5. A slide operation device comprising:
a movement guide of a rod-shape;
a case body having a holding portion for holding the movement guide; and
a moving block that slides on the movement guide for setting an electric parameter as a measurement value in accordance with a movement amount or position of the moving block in a slide direction along the movement guide,
wherein the movement guide comprises: a slide bar that is formed of a rigid member with a strength difficult to be bent, and that is formed with a groove extending along the slide direction; a magnetic scale material that is made from a resin and a magnetic material and that is filled in the groove; and another recess that extends in a circumferential direction of the slide bar along a peripheral surface of an end portion of the slide bar for engagement with the case body,
wherein the movement guide comprised of the slide bar and the magnetic scale material has the rod-shape defined by an outer peripheral surface that is divided into a flat section extending in the slide direction and a round section extending circumferentially from the flat section, and
wherein a portion of the magnetic scale material extends beyond the groove in a circumferential direction around the movement guide.

6. A slide operation device comprising:
a movement guide of a rod-shape; and
a moving block that slides on the movement guide for setting an electric parameter as a measurement value in accordance with a movement amount or position of the moving block in a slide direction along the movement guide,
wherein the movement guide comprises: a slide bar that is formed of a rigid member with a strength difficult to be bent, and that is formed with a groove extending along the slide direction; and a magnetic scale material that is made from a resin and a magnetic material and that is filled in the groove,
wherein the movement guide comprised of the slide bar and the magnetic scale material has the rod-shape defined by an outer peripheral surface, and
wherein an annular recess is formed on the circumference of the outer peripheral surface of the movement guide, and wherein the annular recess is filled with the magnetic scale material.

7. A slide operation device comprising:
a movement guide of a rod-shape;
a case body having a holding portion for holding the movement guide,
a moving block that slides on the movement guide for setting an electric parameter as a measurement value in accordance with a movement amount or position of the moving block in a slide direction along the movement guide,
wherein the movement guide comprises: a slide bar that is formed of a rigid member with a strength difficult to be bent, and that is formed with a generally circular groove forming an undercut on a flat surface of the movement guide extending along the slide direction; and a magnetic scale material that is made from a resin and a magnetic material and that is filled in the groove,
wherein the slide bar is formed with a concave which is deeper than the groove and which extends in a direction perpendicular to the slide direction, and the magnetic scale material is also filled in the concave,
wherein the movement guide comprised of the slide bar and the magnetic scale material has the rod-shape defined by an outer peripheral surface that is divided into a flat section extending in the slide direction and a round section extending circumferentially from the flat section, and
wherein the flat section is configured so as to be held in contact with a contact end face of the holding portion projected from the case body.

8. A slide operation device comprising:
a movement guide of a rod-shape;
a case body having a holding portion for holding the movement guide,
a moving block that slides on the movement guide for setting an electric parameter as a measurement value in accordance with a movement amount or position of the moving block in a slide direction along the movement guide,
wherein the movement guide comprises: a slide bar that is formed of a rigid member with a strength difficult to be bent, and that is formed with a groove extending along the slide direction; a magnetic scale material that is made from a resin and a magnetic material and that is filled in the groove; and another recess that extends in a circumferential direction of the slide bar along a peripheral surface of an end portion of the slide bar for engagement with the case body,
wherein the movement guide comprised of the slide bar and the magnetic scale material has the rod-shape defined by an outer peripheral surface that is divided into a flat section extending in the slide direction and a round section extending circumferentially from the flat section, and
wherein the flat section is configured so as to be held in contact with a contact end face of the holding portion projected from the case body.

* * * * *